US010961327B2

(12) United States Patent
Adachi et al.

(10) Patent No.: US 10,961,327 B2
(45) Date of Patent: Mar. 30, 2021

(54) METHOD FOR PRODUCING HYDROGENATED CONJUGATED DIENE-BASED POLYMER, HYDROGENATED CONJUGATED DIENE-BASED POLYMER, POLYMER COMPOSITION, CROSS-LINKED POLYMER, AND TIRE

(71) Applicant: JSR CORPORATION, Minato-ku (JP)

(72) Inventors: Takumi Adachi, Minato-ku (JP); Hirofumi Senga, Minato-ku (JP); Fumihiro Toyokawa, Minato-ku (JP); Naoya Nosaka, Minato-ku (JP); Takaomi Matsumoto, Minato-ku (JP); Ryoji Tanaka, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 372 days.

(21) Appl. No.: 15/759,425

(22) PCT Filed: Sep. 6, 2016

(86) PCT No.: PCT/JP2016/076167
§ 371 (c)(1),
(2) Date: Mar. 12, 2018

(87) PCT Pub. No.: WO2017/047451
PCT Pub. Date: Mar. 23, 2017

(65) Prior Publication Data
US 2018/0251576 A1  Sep. 6, 2018

(30) Foreign Application Priority Data
Sep. 14, 2015  (JP) .............................. JP2015-181015

(51) Int. Cl.
*C08C 19/02* (2006.01)
*C08F 8/04* (2006.01)
*C08K 3/36* (2006.01)
*C08K 5/548* (2006.01)
*B60C 1/00* (2006.01)

(52) U.S. Cl.
CPC ................ *C08C 19/02* (2013.01); *B60C 1/00* (2013.01); *B60C 1/0016* (2013.01); *B60C 1/0025* (2013.01); *C08F 8/04* (2013.01); *C08K 3/36* (2013.01); *C08K 5/548* (2013.01)

(58) Field of Classification Search
CPC .. C08C 19/02; C08F 8/04; C08K 3/36; C08K 5/548; B60C 1/00; B60C 1/0016; B60C 1/0025
USPC ........................................................ 524/575
See application file for complete search history.

(56) References Cited

U.S. PATENT DOCUMENTS

| 4,501,857 | A | 2/1985 | Kishimoto et al. |
| 4,673,714 | A | 6/1987 | Kishimoto et al. |
| 6,344,538 | B1 | 2/2002 | Sheares |
| 6,838,538 | B2* | 1/2005 | Toyoizumi ............. C08C 19/02 526/336 |
| 7,342,070 | B2 | 3/2008 | Tsukimawashi et al. |
| 8,410,215 | B2* | 4/2013 | Sano ....................... C08L 53/02 525/66 |
| 2002/0151673 | A1 | 10/2002 | Sheares |
| 2003/0100683 | A1 | 5/2003 | Toyoizumi et al. |
| 2004/0044202 | A1 | 3/2004 | Halasa et al. |
| 2004/0254301 | A1 | 12/2004 | Tsukimawashi et al. |
| 2009/0030138 | A1* | 1/2009 | Suzuki ..................... C08L 15/00 524/526 |
| 2009/0264591 | A1 | 10/2009 | Sano et al. |
| 2010/0130669 | A1 | 5/2010 | Higuchi et al. |
| 2014/0275422 | A1* | 9/2014 | Ueba ......................... C08F 8/42 525/102 |
| 2014/0357784 | A1 | 12/2014 | Morita et al. |
| 2015/0183914 | A1 | 7/2015 | Kawai et al. |
| 2015/0252133 | A1 | 9/2015 | Morita et al. |
| 2015/0361210 | A1 | 12/2015 | Nosaka et al. |

FOREIGN PATENT DOCUMENTS

| EP | 1 245 585 A2 | 10/2002 |
| EP | 1 293 535 A2 | 3/2003 |
| EP | 1293535 A2 * | 3/2003 ............. C08L 23/08 |
| EP | 1 980 589 A1 | 10/2008 |
| EP | 2 055 737 A1 | 5/2009 |
| EP | 2 138 537 A1 | 12/2009 |
| EP | 2 789 633 A1 | 10/2014 |
| EP | 2 796 479 A1 | 10/2014 |
| EP | 2 902 415 A1 | 8/2015 |
| JP | 63-4841 B2 | 2/1988 |
| JP | 1-37970 B2 | 8/1989 |
| JP | 2004-18795 A | 1/2004 |
| JP | 2012-505943 A | 3/2012 |
| JP | 2012-197406 A | 10/2012 |
| WO | WO 2014/014052 A1 | 1/2014 |
| WO | WO 2014/050665 A1 | 4/2014 |
| WO | WO 2014/133097 A1 | 9/2014 |

OTHER PUBLICATIONS

International Search Report dated Oct. 18, 2016 in PCT/JP2016/076167 filed Sep. 6, 2016 (with English language translation retrieved on Patentscope of WIPO).

* cited by examiner

*Primary Examiner* — Kelechi C Egwim
(74) *Attorney, Agent, or Firm* — Oblon, McClelland, Maier & Neustadt, L.L.P.

(57) ABSTRACT

Provided is a rubber material that is well-balanced in terms of tensile strength, low hysteresis loss property, wet grip property, and abrasion resistance. A hydrogenated conjugated diene-based polymer which is a hydrogenation product of a conjugated diene-based polymer including butadiene-derived structural units is produced by a method comprising a step of preparing a conjugated diene-based polymer having, at a side chain moiety thereof, a functional group capable of interacting with silica; and a step of hydrogenating the conjugated diene-based polymer so as to achieve a hydrogenation rate of 80 to 99% of butadiene-derived structural units included in the conjugated diene-based polymer.

8 Claims, No Drawings

METHOD FOR PRODUCING HYDROGENATED CONJUGATED DIENE-BASED POLYMER, HYDROGENATED CONJUGATED DIENE-BASED POLYMER, POLYMER COMPOSITION, CROSS-LINKED POLYMER, AND TIRE

TECHNICAL FIELD

The present disclosure relates to a method for producing a hydrogenated conjugated diene-based polymer, a hydrogenated conjugated diene-based polymer, a polymer composition, a crosslinked polymer, and a tire.

BACKGROUND ART

A conjugated diene-based polymer produced through polymerization of a conjugated diene compound exhibits good properties (e.g., thermal resistance, abrasion resistance, mechanical strength, and processability). Thus, the conjugated diene-based polymer has been used in various industrial products, including pneumatic tires, vibration-proof rubbers, and hoses.

As has been known, a rubber composition used for, for example, the tread or sidewall of a pneumatic tire contains a conjugated diene-based polymer, and a reinforcing agent (e.g., carbon black or silica) for improving the durability and abrasion resistance of the tire (see, for example, Patent Document 1). There has been provided a conventional rubber composition containing a modified conjugated diene-based polymer prepared through modification of a terminal of a conjugated diene-based polymer with a functional group. A terminal-modified conjugated diene-based rubber exhibits higher affinity to a reinforcing agent (e.g., carbon black or silica), as compared with an unmodified conjugated diene-based rubber. Thus, use of such a modified conjugated diene-based rubber can reduce heat generation and hysteresis loss, thereby improving low fuel consumption performance.

In recent years, there have been proposed various rubber compositions containing a main-chain-modified conjugated diene-based polymer and, for example, silica (see, for example, Patent Documents 2 to 5). Patent Document 2 discloses a technique for polymerizing a monomer having a functional group (e.g., a substituted amino group), thereby preparing a main-chain-modified conjugated diene-based polymer. Patent Documents 3 to 5 disclose a technique for polymerizing a conjugated diene compound, or both a conjugated diene compound and an aromatic vinyl compound, and then reacting the resultant conjugated diene-based polymer with a modifying agent optionally in the presence of, for example, a catalyst or a radical generator, thereby preparing a main-chain-modified conjugated diene-based polymer.

Patent Document 6 discloses a tire member which is prepared from a hydrogenated product of a modified conjugated diene-based polymer having a specific functional group at one or both terminals of the polymer, and which achieves excellent low fuel consumption performance, high strength, and high abrasion resistance.

PRIOR ART DOCUMENTS

Patent Documents

Patent Document 1: Japanese Patent Application Laid-Open (kokai) No. 2004-18795

Patent Document 2: Japanese Patent Application Laid-Open (kokai) No. 2012-197406

Patent Document 3: International Patent Publication WO 2014/014052

Patent Document 4: International Patent Publication WO 2014/050665

Patent Document 5: Japanese Kohyo Patent Publication 2012-505943

Patent Document 6: International Patent Publication WO 2014/133097

SUMMARY OF THE INVENTION

Problems to be Solved by the Invention

Main chain modification of a conjugated diene-based polymer shows a lower effect of reducing hysteresis loss, as compared with the case of terminal modification of the polymer. Thus, the main chain modification cannot contribute to sufficient improvement in low fuel consumption performance. A rubber material is required to have well-balanced properties in terms of tensile strength, wet grip property, and abrasion resistance.

An object of the present disclosure is to provide a rubber material that is well-balanced in terms of tensile strength, low hysteresis loss property, wet grip property, and abrasion resistance.

Solution to Problem

The present disclosure provides a method for producing a hydrogenated conjugated diene-based polymer, a hydrogenated conjugated diene-based polymer, a polymer composition, a crosslinked polymer, and a tire, which are described below.

[1] A method for producing a hydrogenated conjugated diene-based polymer which is a hydrogenation product of a conjugated diene-based polymer including butadiene-derived structural units, the method comprising:

a step of preparing a conjugated diene-based polymer having, at a side chain moiety thereof, a functional group capable of interacting with silica; and a step of hydrogenating the conjugated diene-based polymer so as to achieve a hydrogenation rate of 80 to 99% of butadiene-derived structural units included in the conjugated diene-based polymer.

[2] A hydrogenated conjugated diene-based polymer which is a hydrogenation product of a conjugated diene-based polymer including butadiene-derived structural units, wherein the hydrogenated conjugated diene-based polymer has, at a side chain moiety thereof, a functional group capable of interacting with silica, and butadiene-derived structural units exhibit a hydrogenation rate of 80 to 99%.

[3] A polymer composition comprising a hydrogenated conjugated diene-based polymer produced by a method described in [1] or a hydrogenated conjugated diene-based polymer described in [2], silica, and a crosslinking agent.

[4] A crosslinked polymer produced through crosslinking of a polymer composition described in [3].

[5] A tire obtained by employing a crosslinked polymer described in [4] as a tread material, a sidewall material, or both.

Advantageous Effects of the Invention

According to the present disclosure, there can be prepared a rubber material that is well-balanced in terms of tensile strength, low hysteresis loss property, wet grip property, and abrasion resistance.

MODES FOR CARRYING OUT THE INVENTION

Embodiments of the present disclosure will now be described in detail.

The hydrogenated conjugated diene-based polymer of the present disclosure is a hydrogenated product of a conjugated diene-based polymer including a structural unit derived from a conjugated diene compound. The hydrogenated conjugated diene-based polymer has, at a side chain moiety thereof, a functional group capable of interacting with silica. The hydrogenated conjugated diene-based polymer can be produced by a process involving polymerization of a monomer containing a conjugated diene compound to thereby prepare a conjugated diene-based polymer, and then hydrogenation of the conjugated diene-based polymer.

As used herein, the "main chain" of a polymer refers to a "stem" moiety of the polymer composed of the longest atomic chain. The "stem" moiety may include a cyclic structure. The "side chain" of a polymer refers to a moiety branching from the "stem" of the polymer. For example, in a conjugated diene-based polymer prepared from a conjugated diene compound represented by the formula "$H_2C=CR^4$—$CH=CH_2$" (where $R^4$ represents a hydrocarbyl group), $R^4$ corresponds to a "side chain."

<Conjugated Diene-Based Polymer>

The conjugated diene compound used in the polymerization includes at least 1,3-butadiene. In the polymerization, as the conjugated diene compound, 1,3-butadiene may be used alone, or a conjugated diene compound other than 1,3-butadiene may be used in combination (hereinafter the conjugated diene compound may be referred to as a "additional conjugated diene compound"). Examples of the additional conjugated diene compound include isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Among these, isoprene and 2,3-dimethyl-1,3-butadiene may preferably be used as the additional conjugated diene compound.

The conjugated diene-based polymer of the present disclosure may be a homopolymer of the conjugated diene compound, but is preferably a copolymer of the conjugated diene compound and an aromatic vinyl compound from the viewpoint of improving the strength of the resulting rubber. Examples of the aromatic vinyl compound used in the polymerization include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, 2-ethylstyrene, 3-ethylstyrene, 4-ethylstyrene, 2-t-butylstyrene, 3-t-butylstyrene, 4-t-butylstyrene, vinylxylene, vinylnaphthalene, and diphenylethylene. Among these, styrene and α-methylstyrene is preferable.

When the conjugated diene-based polymer of the present disclosure is the copolymer of the conjugated diene compound and the aromatic vinyl compound, the copolymer is preferably a polymer formed of the monomer containing 1,3-butadiene and styrene, in view of high living properties during anionic polymerization. The copolymer may typically contain a random copolymer moiety formed of the conjugated diene compound and the aromatic vinyl compound. The copolymer may contain a block moiety formed of the conjugated diene compound or the aromatic vinyl compound.

The conjugated diene compound or aromatic vinyl compound used for the polymerization may contain a compound having a functional group capable of interacting with silica (hereinafter may be referred to as a "modifying monomer"). The polymerization by use of such a modifying monomer can introduce a functional group capable of interacting with silica into a side chain moiety of the conjugated diene-based polymer. As used herein, the term "functional group capable of interacting with silica" refers to a group having at least one element capable of interacting with silica. Examples of the element include nitrogen, sulfur, phosphorus, oxygen, Group 4 elements of the periodic table, and Group 13 elements of the periodic table.

No particular limitation is imposed on the modifying monomer, so long as it has a functional group capable of interacting with silica. Specific examples of the modifying monomer include conjugated diene compounds, such as bis(dimethylamino)methyl(1-methylene-2-propenyl)silane, bis(diethylamino)methyl(1-methylene-2-propenyl)silane, tris(dimethylamino) (1-methylene-2-propenyl)silane, 2-N, N-dimethylamino-1,3-butadiene, 2-N,N-diethylamino-1,3-butadiene, 2-N,N-bis(trimethylsilyl)amino-1,3-butadiene, 2-(1-piperidinyl)-1,3-butadiene, 2-N,N-dimethylaminomethyl-1,3-butadiene, and 1-methyl-2-(1-methylene-2-propenyl)pyrrolidine; and aromatic vinyl compounds, such as N,N-dimethylaminoethylstyrene, N,N-dimethylaminomethylstyrene, vinylpyridine, tertiary-amino-group-containing diphenylethylene (e.g., 1-(4-N,N-dimethylaminophenyl)-1-phenylethylene), 4-N,N-bis(trimethylsilyl)aminostyrene, 3-N,N-bis(trimethylsilyl)aminostyrene, 4-N,N-dimethylaminomethylstyrene, 3-N,N-dimethylaminomethylstyrene, 4-(1-pyrrolidinyl)ethylstyrene, and 3-(1-pyrrolidinyl)ethylstyrene.

When the conjugated diene-based polymer is the copolymer of the conjugated diene compound and the aromatic vinyl compound, the amount of the aromatic vinyl compound used for the polymerization is preferably 3 to 55 mass %, more preferably 5 to 50 mass %, relative to the total amount of the conjugated diene compound and aromatic vinyl compound used for the polymerization, from the viewpoint of a good balance between low hysteresis loss property and wet skid resistance of the resultant crosslinked polymer. The amount of the structural unit derived from the aromatic vinyl compound in the polymer is measured by means of $^1$H-NMR. These conjugated diene compounds and aromatic vinyl compounds may be used singly or in combination of two or more species.

In the case of polymerization by use of a modifying monomer, the amount of the modifying monomer is preferably 0.01 mass % or more, more preferably 0.02 mass % or more, still more preferably 0.05 mass % or more, relative to the total amount of the monomers used for the polymerization, in order to achieve a sufficient effect of reducing hysteresis loss. The amount of the modifying monomer used is preferably 20 mass % or less, more preferably 5 mass % or less, still more preferably 3 mass % or less, in order to prevent a reduction in the elongation at break of the resultant crosslinked rubber.

The polymerization may involve the use of an additional monomer other than the conjugated diene compound and the aromatic vinyl compound. Examples of the additional monomer include acrylonitrile, methyl (meth)acrylate, ethyl (meth)acrylate, and a vinyl compound having a functional group capable of interacting with silica. Specific examples of the vinyl compound having a functional group capable of interacting with silica include bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane.

The amount of the additional monomer used is preferably 25 mass % or less, more preferably 15 mass % or less, still more preferably 10 mass % or less, relative to the total amount of the monomers used for the polymerization.

The monomer may be polymerized using a solution polymerization method, a vapor-phase polymerization method, or a bulk polymerization method. Among these, the solution polymerization method is particularly preferable. The monomer may be polymerized in a batch-wise manner or a continuous manner. When using the solution polymerization method, the monomer that includes the conjugated diene compound may be polymerized in an organic solvent in the presence of an initiator and an optional randomizer, for example.

At least one of an alkali metal compound and an alkaline-earth metal compound may be used as the initiator. Specific examples of the alkali metal compound and the alkaline-earth metal compound include alkyllithiums, such as methyllithium, ethyllithium, n-propyllithium, n-butyllithium, sec-butyllithium, and tert-butyllithium, 1,4-dilithiobutane, phenyllithium, stilbenelithium, naphthyllithium, 1,3-bis(1-lithio-1,3-dimethylpentyl)benzene, 1,3-phenylenebis(3-methyl-1-phenylpentylidene)dilithium, naphthylsodium, naphthylpotassium, di-n-butylmagnesium, di-n-hexylmagnesium, ethoxypotassium, and calcium stearate. Among these, lithium compounds are preferable. The initiator is preferably used in an amount of 0.2 to 20 mmol based on 100 g of the monomer used for polymerization.

The monomer may be polymerized in the presence of a compound that is obtained by mixing at least one of the alkali metal compound and the alkaline-earth metal compound with a compound having a functional group that interacts with silica (hereinafter the compound may be referred to as a "modifying initiator"). The functional group that interacts with silica can be introduced into the polymerization-initiation terminal of the conjugated diene-based polymer by polymerizing the monomer in the presence of the modifying initiator. The term "interaction" used herein means that a covalent bond is formed between molecules, or an intermolecular force (intermolecular electromagnetic force such as ion-dipole interaction, dipole-dipole interaction, a hydrogen bond, or Van der Waals force) that is weaker than a covalent bond is formed.

The modifying initiator is preferably a reaction product of at least one of the alkali metal compound and the alkaline-earth metal compound and a nitrogen-containing compound (e.g., a secondary amine compound), more preferably a reaction product of a lithium compound (e.g., alkyllithium) and the nitrogen-containing compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane.

When polymerizing the monomer in the presence of the modifying initiator, the modifying initiator may be prepared by mixing at least one of the alkali metal compound and the alkaline-earth metal compound with the compound having a functional group that interacts with silica, and added to the polymerization system. Alternatively, at least one of the alkali metal compound and the alkaline-earth metal compound, and the compound having a functional group that interacts with silica may be added to the polymerization system, and mixed in the polymerization system to prepare the modifying initiator.

The randomizer may be used to adjust vinyl bond content that represents the content of vinyl bonds in the polymer, for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. These compounds may be used singly or in combination of two or more species.

The organic solvent used for polymerization may be an organic solvent that is inert to the reaction. Examples of the organic solvent used for polymerization include aliphatic hydrocarbons, alicyclic hydrocarbons, and aromatic hydrocarbons. It is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used singly or in combination of two or more species.

When using the solution polymerization method, the monomer concentration in the reaction solvent is preferably 5 to 50 mass %, and more preferably 10 to 30 mass %, from the viewpoint of maintaining the balance between productivity and polymerization controllability. The polymerization reaction temperature is preferably −20 to 150° C., more preferably 0 to 120° C., and particularly preferably 20 to 100° C. It is preferable to effect the polymerization reaction under a pressure sufficient to substantially maintain the monomer to be in a liquid phase. Such a pressure may be achieved by pressurizing the reactor using gas that is inert to the polymerization reaction, for example.

The polymerization reaction can produce a conjugated diene-based polymer having an active terminal. The resultant conjugated diene-based polymer preferably has a weight average molecular weight (Mw) (in terms of polystyrene) of $1.0 \times 10^5$ to $2.0 \times 10^6$ as measured by means of gel permeation chromatography (GPC). An Mw of less than $1.0 \times 10^5$ may lead to deterioration of tensile strength, low fuel consumption performance, and abrasion resistance of the resultant vulcanized rubber, whereas an Mw exceeding $2.0 \times 10^6$ may lead to poor processability of the polymer composition. The Mw is more preferably $1.2 \times 10^5$ to $1.5 \times 10^6$, still more preferably $1.5 \times 10^5$ to $1.0 \times 10^6$.

In the conjugated diene-based polymer having the active terminal, the vinyl bond content of a butadiene-derived structural unit is preferably 30 to 65 mol %, more preferably 33 to 62 mol %, still more preferably 35 to 60 mol %. The vinyl bond content of less than 30 mol % may lead to very poor grip property, whereas the vinyl bond content exceeding 65 mol % may lead to a reduction in the abrasion resistance of the resultant vulcanized rubber. As used herein, the term "vinyl bond content" refers to the percentage of the structural unit having a 1,2-bond with respect to all the butadiene-derived structural units in the conjugated diene-based polymer. The vinyl bond content is measured by means of $^1$H-NMR.

<Terminal Modification Reaction>

The polymerization reaction of the conjugated diene-based polymer may be terminated by use of, for example, an alcohol. Alternatively, the active terminal of the conjugated diene-based polymer prepared through the polymerization reaction may be reacted with a compound having a functional group capable of interacting with silica (hereinafter the compound may be referred to as a "terminal modifying compound"). Such a process can produce the hydrogenated conjugated diene-based polymer of the present disclosure; i.e., a polymer having a terminal modified with a functional group capable of interacting with silica. A polymer having, at both terminals thereof, a functional group capable of interacting with silica can be produced by reacting the terminal modifying compound with a conjugated diene-based polymer prepared through polymerization by use of the modification initiator.

No particular limitation is imposed on the terminal modifying compound, so long as it has a functional group capable of interacting with silica and can react with the active terminal of the polymer. The terminal modifying compound is preferably a compound containing one atom selected from the group consisting of a nitrogen atom, a sulfur atom, a phosphorus atom, an oxygen atom, and a silicon atom. Specific examples of preferred terminal modifying compounds include compounds (I) to (III) described below.

(I) Compound (B2-1) Represented by Formula (1):

(1)

wherein $A^1$ is a monovalent functional group that includes at least one atom selected from the group consisting of a nitrogen atom, a phosphorus atom, and a sulfur atom, and does not include active hydrogen, the monovalent functional group being bonded to $R^3$ through a nitrogen atom, a phosphorus atom, or a sulfur atom, $R^1$ and $R^2$ are a hydrocarbyl group, $R^3$ is a hydrocarbylene group, and n is an integer from 0 to 2, provided that a plurality of $R^1$ are either identical or different when a plurality of $R^1$ are present, and a plurality of $R^2$ are either identical or different when a plurality of $R^2$ are present.

(II) Compound (B2-2) that includes a functional group X and a group Y in its molecule, the functional group X being at least one functional group selected from the group consisting of a cyclic ether group, a (thio)carbonyl group, and an iso(thio)cyanate group, and the group Y including at least one atom selected from the group consisting of a nitrogen atom, a phosphorus atom, an oxygen atom, and a sulfur atom (provided that a nitrogen atom, a phosphorus atom, and a sulfur atom may be protected by a trisubstituted hydrocarbylsilyl group), and not including active hydrogen, the group Y differing from the functional group X (III) Compound (B2-3) that includes two or more iso(thio)cyanate groups in its molecule These terminal modifying compounds may be used singly or in combination of two or more species. The term "(thio) carbonyl group" used herein refers to "carbonyl group" and "thiocarbonyl group". The term "iso(thio)cyanate group" used herein refers to "isocyanate group" and "isothiocyanate group".

The hydrocarbyl group represented by $R^1$ and $R^2$ in the formula (1) is preferably a linear or branched alkyl group having 1 to 20 carbon atoms, a cycloalkyl group having 3 to 20 carbon atoms, or an aryl group having 6 to 20 carbon atoms.

$R^3$ is preferably a linear or branched alkanediyl group having 1 to 20 carbon atoms, a cycloalkylene group having 3 to 20 carbon atoms, or an arylene group having 6 to 20 carbon atoms.

It is preferable that n be 0 or 1 from the viewpoint of improving the reactivity with the conjugated diene-based polymer.

$A^1$ includes at least one atom selected from the group consisting of a nitrogen atom, a phosphorus atom, and a sulfur atom (hereinafter may be referred to as "specific atom"), and is bonded to $R^3$ through the specific atom. The specific atom is not bonded to active hydrogen. The specific atom may be protected by a protecting group.

The term "active hydrogen" used herein refers to a hydrogen atom that is bonded to an atom other than a carbon atom, and preferably refers to a hydrogen atom that has a bonding energy lower than that of the carbon-hydrogen bond of polymethylene. The term "protecting group" used herein refers to a functional group that converts $A^1$ into an inactive functional group with respect to the active terminal of the polymer. Examples of the protecting group include a trisubstituted hydrocarbylsilyl group.

It is preferable that $A^1$ be a group that may produce an onium ion due to an onium salt generator. When the terminal modifying compound has such a group ($A^1$), it is possible to provide the hydrogenated conjugated diene-based polymer with an excellent shape retention capability.

Specific examples of the compound (B2-1) that includes a nitrogen-containing group in which two hydrogen atoms of a primary amino group are substituted with two protecting groups, a nitrogen-containing group in which one hydrogen atom of a secondary amino group is substituted with one protecting group, or a tertiary amino group, and an alkoxysilyl group, include N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, 3-(4-trimethylsilyl-1-piperazino)propylmethyldimethoxysilane, and compounds obtained by substituting the alkyl group or the alkanediyl group included in these compounds with a C1 to C6 alkyl group or a C1 to C6 alkanediyl group.

Specific examples of the compound (B2-1) that includes a group having a carbon-nitrogen double bond, or a nitrogen-containing heterocyclic group, and an alkoxysilyl group, include N-(1,3-dimethylbutylidene)-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, N-(3-trimethoxysilylpropyl)-4,5-dihydroimidazole, N-(3-trimethoxysilylpropyl)imidazole, 3-hexamethyleneiminopropyltrimethoxysilane, 3-hexamethyleneiminopropylmethyldimethoxysilane, 3-(1-piperidino)propyltrimethoxysilane, 3-(1-hexamethyleneimino)propyltrimethoxysilane, 3-(1-piperazinyl)propyltrimethoxysilane, 3-morpholinopropyltrimethoxysilane, and compounds obtained by substituting the alkyl group or the alkanediyl group included in these compounds with a C1 to C6 alkyl group or a C1 to C6 alkanediyl group.

Specific examples of the compound (B2-1) that includes a phosphorus-containing group in which two hydrogen atoms of a primary phosphino group are substituted with two protecting groups, a phosphorus-containing group in which one hydrogen atom of a secondary phosphino group is substituted with one protecting group, a tertiary phosphino group, or a sulfur-containing group in which one hydrogen atom of a thiol group is substituted with one protecting group, and an alkoxysilyl group, include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphospinopropyltrimethoxysilane, 3-diphenylphospinopropylmethyldimethoxysilane, S-trimethylsilylmercaptopropylmethyldimethoxysilane, S-trimethylsilylmercaptopropyltrimethoxysilane, and compounds obtained by substituting the alkyl group or the alkanediyl group included in these compounds with a C1 to C6 alkyl group or a C1 to C6 alkanediyl group.

Examples of the compound (B2-1) that includes an iso(thio)cyanate group include 3-isocyanatopropyltrimethoxysilane, and 3-isocyanatopropyltriethoxysilane.

The compound (B2-2) is preferably that the group Y is a group having a nitrogen atom that is not bonded to active hydrogen. Specific examples of the compound (B2-2) that includes a cyclic ether group include epoxyamine compounds, such as tetraglycidyl-1,3-bisaminomethylcyclohexane.

Specific examples of the compound (B2-2) that includes a (thio)carbonyl group include 4-aminoacetophenones, such as 4-N,N-dimethylaminobenzophenone; bis(dihydrocarbylaminoalkyl) ketones, such as 1,7-bis(methylethylamino)-4-heptanone; dihydrocarbylaminoalkyl (meth)acrylates, such as 2-dimethylaminoethyl acrylate;

hydrocarbylimidazolidinones, such as 1,3-dimethyl-2-imidazolidinone; N-hydrocarbylpyrrolidones such as 1-phenyl-2-pyrrolidone; N-hydrocarbylcaprolactams, such as N-methyl-ε-caprolactam; N-dihydrocarbylformamides, such as N,N-diethylformamide; N,N-dihydrocarbylacetamides, such as N,N-dimethylacetamide; (meth)acrylamides, such as N,N-dimethylacrylamide. Specific examples of the compound (B2-2) that includes an iso(thio)cyanate group include 3-isocyanatopropyltrimethoxysilane.

Specific examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl) thiophosphate, xylene diisocyanate, benzene-1,2,4-triisocyanate, naphthalene-1,2,5,7-tetraisocyanate, and 1,4-phenylene diisothiocyanate. These terminal modifying compounds may be used singly or in combination of two or more species.

The terminal modifying compound is particularly preferably the compound (B2-1) in the view of strong affinity to silica. When using the compound (B2-1) as the terminal modifying compound, silicon tetrachloride, an epoxy-containing compound (e.g., tetraglycidyl-1,3-bisaminomethylcyclohexane), or the like may be used in combination with the compound (B2-1) in order to adjust the Mooney viscosity of the conjugated diene-based polymer.

The modification reaction may be effected as a solution reaction, for example. The solution reaction may be effected directly using the solution that includes unreacted monomers after completion of the polymerization reaction, or may be effected after isolating the conjugated diene-based polymer included in the solution, and dissolving the conjugated diene-based polymer in an appropriate solvent (e.g., cyclohexane). The modification reaction may be effected in a batch-wise manner or a continuous manner. In this case, the terminal modifying compound may be added using an arbitrary method. For example, the terminal modifying compound may be added at a time, or may be added stepwise, or may be added successively.

The amount of the terminal modifying compound used for the modification reaction may be appropriately determined taking account of the type of compound used for the reaction. The terminal modifying compound is preferably used in an amount of 0.1 molar equivalents or more, and more preferably 0.3 molar equivalents or more, relative to the metal atom (responsible for the polymerization reaction) of the initiator. When the terminal modifying compound is used in an amount of 0.1 molar equivalents or more, the modification reaction proceeds sufficiently, and the dispersibility of silica can be advantageously improved.

The modification reaction temperature is normally set to be equal to the polymerization reaction temperature, preferably −20 to 150° C., more preferably 0 to 120° C., and particularly preferably 20 to 100° C. If the modification reaction temperature is low, the viscosity of the modified conjugated diene-based polymer may increase. If the modification reaction temperature is high, the polymerization active terminal may be easily inactivated. The modification reaction time is preferably 1 minute to 5 hours, and more preferably 2 minutes to 1 hour.

<Main Chain Modification Reaction>

The hydrogenated conjugated diene-based polymer having, at a side chain moiety thereof, a functional group capable of interacting with silica is produced by a method involving polymerization of a monomer having a functional group capable of interacting with silica (e.g., any of the aforementioned modifying monomers, or the vinyl compound having a functional group capable of interacting with silica). Alternatively, the hydrogenated conjugated diene-based polymer may be produced by a method involving formation of an active moiety at either or both of an unsaturated bond moiety and a functional group moiety of the conjugated diene-based polymer (these moieties differ from the terminals of the polymer), and then reaction of the active moiety with a compound having a functional group capable of interacting with silica (hereinafter the compound may be referred to as a "specific compound"). Specific examples of such a method include the following methods <1> to <3>:

<1> a method involving reaction of a compound containing a Group 4 or 13 element of the periodic table (hereinafter the compound may be referred to as a "compound [A]"), serving as the specific compound, with an unsaturated bond moiety of the conjugated diene-based polymer (the moiety differs from the terminals of the polymer);

<2> a method involving lithiation of at least one of an unsaturated bond moiety and a functional group moiety of the conjugated diene-based polymer (these moieties differ from the terminals of the polymer), and then reaction of the lithiated polymer with the specific compound; and <3> a method involving reaction of an unsaturated bond moiety of the conjugated diene-based polymer (the moiety differs from the terminals of the polymer) with the specific compound in the presence of a radical generator. Preferably, any of these methods <1> to <3> is used.

(Method <1>)

Examples of the Group 4 element contained in the compound [A] include titanium, zirconium, and hafnium. Examples of the Group 13 element include boron, aluminum, gallium, indium, and thallium. In particular, the compound [A] is preferably a compound containing titanium, zirconium, boron, or aluminum, more preferably a compound containing boron or aluminum. The compound [A] is particularly preferably a boron-containing compound, since such a compound exhibits high reactivity with a double bond and strong interaction with silica and achieves improvements in hysteresis loss property and wet skid property.

Among compounds [A], the compound containing a Group 4 element is preferably a metallocene compound or an indenyl compound. Specific examples of such a compound include titanium-containing compounds, such as bis(cyclopentadienyl)titanium monochloride monohydride, bis(indenyl)titanium monochloride monohydride, bis(methylcyclopentadienyl)titanium monochloride monohydride, and bis(ethylcyclopentadienyl)titanium monochloride monohydride; zirconium-containing compounds, such as bis(cyclopentadienyl)zirconium monochloride monohydride, bis(methylcyclopentadienyl)zirconium monochloride monohydride, and bis(ethylcyclopentadienyl) zirconium monochloride monohydride; and hafnium-containing compounds, such as bis(cyclopentadienyl)hafnium monochloride monohydride and bis(cyclopentadienyl)hafnium dihydride.

Among compounds [A], the compound containing a Group 13 element is preferably a compound having a boron-hydrogen bond or a compound having an aluminum-hydrogen bond. Particularly preferred is a compound having a boron-hydrogen bond, since such a compound exhibits high reactivity with a double bond and strong interaction with silica and achieves improvements in hysteresis loss property and wet skid property. Boron has an unoccupied orbital. Conceivably, the presence of an unoccupied orbital contributes to stronger silica-metal (boron) interaction.

Examples of preferred compounds [A] include compounds having a boron-hydrogen bond, such as alkylboranes (e.g., 9-borabicyclo[3.3.1]nonane, disiamylborane, thexylborane, and diisopinocampheylborane), alkoxyboranes (e.g., pinacolborane and catecholborane), halides (e.g., H—$BX_2$ (where X represents a hydrogen atom, a chlorine atom, or a bromine atom, and at least one X is a chlorine atom or a bromine atom)), monoboranes, and diboranes; and compounds having an aluminum-hydrogen bond, such as aluminum lithium hydride, diethyl aluminum hydride, di-n-propyl aluminum hydride, diisopropyl aluminum hydride, and diisobutyl aluminum hydride.

The reaction between the conjugated diene-based polymer and the compound [A] may be a solution reaction. The solution reaction may be performed by use of a solution after completion of the aforementioned polymerization reaction without any treatment of the solution. Alternatively, the solution reaction may be performed after isolation of the polymer contained in the solution and dissolution of the isolated polymer in an appropriate solvent (e.g., cyclohexane). The reaction between the conjugated diene-based polymer and the compound [A] may be performed by a batch or continuous process. No particular limitation is imposed on the method of adding the compound [A]. For example, the compound [A] may be added at one time or in a divided or continuous manner.

No particular limitation is imposed on the amount of the compound [A] used for the reaction. The amount of the compound [A] is preferably 0.1 to 20 mol, more preferably 1 to 10 mol, relative to 1 mol of the polymer. The reaction temperature is generally equal to the aforementioned polymerization reaction temperature, and is preferably −20 to 150° C., more preferably 0 to 120° C., still more preferably 20 to 100° C. The reaction time is preferably 1 minute to 3 hours, more preferably 2 minutes to 1 hour. Through such a modification reaction, a Group 4 or 13 element of the periodic table is added to an unsaturated bond moiety (different from the terminals) of the conjugated diene-based polymer.

In method <1>, the modified conjugated diene-based polymer prepared through reaction with the compound [A] may be subjected to hydrogenation reaction, to thereby produce the hydrogenated conjugated diene-based polymer of the present disclosure. Alternatively, the polymer prepared through reaction with the compound [A] may be reacted with a specific compound different from the compound [A](hereinafter the specific compound may be referred to as a "compound [B]") to thereby prepare a conjugated diene-based polymer having, at a side chain moiety thereof, a functional group capable of interacting with silica, and the conjugated diene-based polymer may be subjected to hydrogenation reaction, to thereby produce the hydrogenated conjugated diene-based polymer of the present disclosure.

No particular limitation is imposed on the compound [B](i.e., a specific compound), so long as it has a functional group capable of interacting with silica and can react with the reactive moiety of the conjugated diene-based polymer prepared through reaction with the compound [A]. Examples of the compound [B] include an amino-group-containing alkoxysilane, a diamine compound, a polyhydric alcohol, a polyvalent carboxylic acid, and an amino acid compound. Specific examples of the amino-group-containing alkoxysilane include 3-aminopropyltrimethoxysilane, 3-aminopropyltriethoxysilane, 3-aminopropylmethyldimethoxysilane, 3-aminopropylethyldimethoxysilane, 3-aminopropyldimethylmethoxysilane, 3-aminopropyldimethylethoxysilane, 3-aminopropylmethyldiethoxysilane, 3-aminopropyldimethylbutoxysilane, 3-aminopropylmethyldibutoxysilane, 3-(2-aminoethylamino)propyltrimethoxysilane, N-[2-[3-(trimethoxysilyl)propylamino]ethyl]ethylenediamine, and N-[2-[3-(triethoxysilyl)propylamino]ethyl]ethylenediamine.

Specific examples of the diamine compound include ethylenediamine, tetramethylenediamine, hexamethylenediamine, and 4,4'-diaminodiphenyl ether.

Specific examples of the polyhydric alcohol include ethylene glycol, propylene glycol, diethylene glycol, trimethylolpropane, pentaerythritol, and N,N,N',N'-tetrakis(2-hydroxypropyl)ethylenediamine.

Specific examples of the polyvalent carboxylic acid include oxalic acid, malonic acid, phthalic acid, and 1,2,3,4-butanetetracarboxylic acid.

Specific examples of the amino acid compound include alanine, arginine, aspartic acid, histidine, glutamic acid, tyrosine, and cysteine.

Of these, an amino-group-containing alkoxysilane is preferably used in view of strong affinity to silica. These compounds [B] may be used singly or in combination of two or more species.

The reaction between the compound [B] and the conjugated diene-based polymer prepared through reaction with the compound [A] may be, for example, a solution reaction. The solution reaction may be performed by use of a solution prepared through reaction with the compound [A] without any treatment of the solution. Alternatively, the solution reaction may be performed after isolation of the polymer contained in the solution and dissolution of the isolated polymer in an appropriate solvent (e.g., cyclohexane). The reaction may be performed by a batch or continuous process.

No particular limitation is imposed on the method of adding the compound [B]. For example, the compound [B] may be added at one time or in a divided or continuous manner.

The amount of the compound [B] used for the aforementioned reaction is adjusted such that the functional group moiety of the compound [B] is preferably 0.1 to 20 mol, more preferably 1 to 10 mol, relative to 1 mol of the polymer. The reaction temperature is generally equal to the aforementioned polymerization reaction temperature, and is preferably −20 to 150° C., more preferably 0 to 120° C., particularly preferably 20 to 100° C. The reaction time is preferably 1 minute to 5 hours, more preferably 2 minutes to 1 hour.

(Method <2>)

No particular limitation is imposed on the specific compound used for the reaction in method <2>, so long as it has a functional group capable of interacting with silica and can react with the active moiety formed through lithiation. Specific examples of preferred specific compounds include the aforementioned compounds (B2-1), (B2-2), and (B2-3). Of these compounds, the compound (B2-1) is preferably used in view of strong affinity to silica. These specific compounds may be used singly or in combination of two or more species. In the case where the specific compound used for the main chain modification is the same as the modifying compound used for the terminal modification, the terminal modification reaction may be performed simultaneously with the main chain modification reaction.

The conjugated diene-based polymer may be subjected to lithiation by reacting the conjugated diene-based polymer obtained by the polymerization reaction with a lithiation agent in the presence of a promoter (e.g., tetramethylethylenediamine). This reaction lithiates the allylic position of the structural unit that is included in the conjugated diene-based polymer and derived from the conjugated diene compound, or the benzylic position of the structural unit that is included in the conjugated diene-based polymer and derived from the aromatic vinyl compound.

Examples of the lithiation agent used for the reaction include methyllithium, n-butyllithium, s-butyllithium, and t-butyllithium. The amount of the lithiation agent used for the reaction is not particularly limited. It is preferable to use the lithiation agent in such an amount that the molar equivalent of the lithiation agent is 0.1 to 20, and more preferably 1 to 10, based on 1 molar equivalent of the polymer.

The lithiation reaction may be effected as a solution reaction, for example. The solution reaction may be effected directly using the solution that includes unreacted monomers after completion of the polymerization reaction, or may be effected after isolating the polymer included in the solution, and dissolving the polymer in an appropriate solvent (e.g., cyclohexane). The lithiation reaction temperature is normally set to be equal to the polymerization reaction temperature, preferably −20 to 150° C., more preferably 0 to 120° C., and particularly preferably 20 to 100° C. The reaction time is preferably 1 minute to 3 hours, and more preferably 2 to 30 minutes.

After completion of the lithiation reaction, the conjugated diene-based polymer is reacted with the specific compound preferably in the solution. Through this process, the lithiated moiety of the conjugated diene-based polymer can be bonded to the functional group moiety of the specific compound, to thereby produce a polymer having, at a side chain moiety thereof, a functional group capable of interacting with silica. The amount of the specific compound used for the aforementioned reaction is preferably 0.1 to 10 mole equivalents, more preferably 0.3 to 5 mole equivalents, relative to 1 mole equivalent of the hydrometallation agent used. The reaction temperature is generally equal to the aforementioned polymerization reaction temperature, and is preferably −20 to 150° C., more preferably 0 to 120° C., still more preferably 20 to 100° C. The reaction time is preferably 1 minute to 5 hours, more preferably 2 minutes to 1 hour.

(Method <3>)

No particular limitation is imposed on the radical generator used in method <3>. Examples of the radical generator include a compound which generates radicals by heating, and a compound which generates radicals by irradiation with radiation.

Examples of the compound which generates radicals by heating include a peroxide, an azo compound, and a redox initiator. Specific examples of the peroxide include t-butyl hydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, and ammonium persulfate.

Specific examples of the azo compound include azobisisobutyronitrile (AIBN), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutylamidine) dichloride, 2,2'-azobis(N,N-dimethyleneisobutylamide), 2,2'-azobis(2-methyl-N-[1,1-bis(hydroxymethyl)-2-hydroxyethyl]propionamide), and 2,2'-azobis(isobutylamide) dihydrate.

Specific examples of the redox initiator include a combination of a persulfate, acidic sodium sulfite, and ferrous sulfate, a combination of t-butyl hydroperoxide, acidic sodium sulfite, and ferrous sulfate, and a combination of p-menthane hydroperoxide, ferrous sulfate, ethylenediamine sodium tetraacetate, and sodium formaldehyde sulfoxylate. The compound which generates radicals by heating is preferably an azo compound, particularly preferably azobisisobutyronitrile, in view of less generation of by-products by, for example, oxygen.

Specific examples of the compound which generates radicals by irradiation with radiation include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4,4'-dimethoxybenzophenone, benzoin propyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy)phenyl-(2-hydroxy-2-propyl) ketone, 2,4,6-trimethylbenzoyldiphenylphosphine oxide, and bis-(2,6-dimethoxybenzoyl)-2,4,4-trimethylpentylphosphine oxide. These radical generators may be used singly or in combination of two or more species.

The specific compound used in method <3> is preferably a dihydroxymercaptan. No particular limitation is imposed on the dihydroxymercaptan, so long as it has two hydroxy groups and one mercapto group. Specific examples of preferred dihydroxymercaptans include 3-mercaptopropane-1, 2-diol, 2-mercaptopropane-1,3-diol, 3-mercapto-2-methylpropane-1,2-diol, 2-mercapto-2-methylpropane-1,3-diol, 4-mercaptobutane-1,2-diol, 2-mercaptomethyl-2-methylpropane-1,3-diol, 5-mercaptopentane-1,2-diol, 5-mercaptopentane-1,3-diol, 3-mercaptocyclopentane-1,2-diol, 4-mercaptocyclopentane-1,3-diol, 2-mercapto-4-cyclopentene-1,3-diol, 3-mercapto-4-cyclopentene-1,2-diol, 4-mercaptocyclohexane-1,2-diol, 5-mercaptocyclohexane-1,3-diol, 2,5-dihydroxythiophenol, 2,6-dihydroxythiophenol, 2,4-dihydroxythiophenol, and 3,5-dihydroxythiophenol. These dihydroxymercaptans may be used singly or in combination of two or more species.

The reaction between the specific compound and the conjugated diene-based polymer prepared through the aforementioned polymerization reaction may be, for example, a solution reaction in the presence of a radical generator. The solution reaction may be performed by use of a solution containing unreacted monomers after completion of the polymerization reaction without any treatment of the solution. Alternatively, the solution reaction may be performed after isolation of the polymer contained in the solution and dissolution of the isolated polymer in an appropriate solvent (e.g., cyclohexane).

The amount of the radical generator used for the reaction is preferably 0.01 to 5 mole equivalents, more preferably 0.05 to 2 mole equivalents, relative to 1 mole equivalent of the polymer. The amount of the specific compound used for the reaction is preferably 0.01 to 5 parts by mass, more preferably 0.1 to 4 parts by mass, relative to 100 parts by mass of the conjugated diene-based polymer.

The reaction temperature is preferably 50 to 150° C., more preferably 70 to 120° C., particularly preferably 70 to 100° C. The reaction time is preferably 30 minutes to 24 hours, more preferably 1 to 12 hours.

<Hydrogenation>

The hydrogenated conjugated diene-based polymer of the present disclosure can be produced through hydrogenation of the above-prepared conjugated diene-based polymer. In the present disclosure, the conjugated diene-based polymer having, at a side chain moiety thereof, a functional group capable of interacting with silica is subjected to hydrogenation. The terminals of the polymer may be unmodified, or one or both terminals of the polymer may be modified. In the case of application to tires, one or both terminals of the polymer are preferably modified, in view of improvements in tire properties (low fuel consumption performance and abrasion resistance) of the vulcanized rubber.

The hydrogenation may be performed by any method under any conditions, so long as the resultant polymer exhibits a desired hydrogenation rate. Examples of the hydrogenation method include a method involving the use of a hydrogenation catalyst containing an organic titanium compound as a main component; a method involving the use of a catalyst containing an organic compound of iron, nickel, or cobalt and an organic metal compound (e.g., an alkylaluminum); a method involving the use of an organic complex of an organic metal compound of, for example, ruthenium or rhodium; and a method involving the use of a catalyst including a carrier (e.g., carbon, silica, or alumina) on which a metal (e.g., palladium, platinum, ruthenium, cobalt, or nickel) is supported. Of these methods, industrially preferred is a method involving hydrogenation under mild conditions (low pressure and low temperature) by use of a homogeneous catalyst containing an organic titanium compound only, or containing an organic titanium compound and an organic compound of a metal (lithium, magnesium, or aluminum) (Japanese Kokoku Patent Publication Nos. S63-4841 and H01-37970). Such a hydrogenation method achieves high hydrogenation selectivity to a double bond derived from butadiene, and is suitable for the object of the present disclosure.

The hydrogenation may be performed in a solvent that is inert to the catalyst and can dissolve the conjugated diene-based polymer. An aliphatic hydrocarbon such as n-pentane, n-hexane, and n-octane, an alicyclic hydrocarbon such as cyclohexane and cyclohexane, an aromatic hydrocarbon such as benzene and toluene, an ether such as diethyl ether and tetrahydrofuran, and a mixture that includes them as the main component are preferable as the solvent.

The hydrogenation reaction is normally effected by holding a polymer at a given temperature in a hydrogen atmosphere or an inert atmosphere, adding the hydrogenation catalyst to the conjugated diene-based polymer with or without stirring, and introducing hydrogen gas to pressurize the system to a given pressure. The term "inert atmosphere" used herein refers to an atmosphere that does not react with the materials that are subjected to the hydrogenation reaction. Examples of the inert atmosphere include helium, neon, and argon. It is not desirable to be present air or oxygen since inactivation of the catalyst may occur due to oxidation. It is not desirable to be present nitrogen since nitrogen may act as a catalyst poison during the hydrogenation reaction, and decrease the hydrogenation activity. It is preferable to fill the hydrogenation reactor with hydrogen gas.

The hydrogenation reaction process for obtaining the hydrogenated conjugated diene-based polymer may be effected using a batch process, a continuous process, or a combination thereof. When a titanocene diaryl-based compound is used as the hydrogenation catalyst, the titanocene diaryl-based compound may be added directly to the reaction solution, or may be dissolved in an inert organic solvent, and the resulting solution may be added to the reaction solution. No particular limitation is imposed on the inactive organic solvent in which the catalyst is dissolved, so long as it is a solvent that does not react with the materials that are subjected to the hydrogenation reaction. It is preferable to use the same solvent as that used for the hydrogenation reaction. The hydrogenation catalyst is preferably added in an amount of 0.02 to 20 mmol per 100 g of the unhydrogenated conjugated diene-based polymer.

In the hydrogenated conjugated diene-based polymer, the hydrogenation rate of butadiene-derived structural units is 80 to 99%. A hydrogenation rate of 80% or more can achieve a crosslinked polymer exhibiting sufficiently improved mechanical strength, and a rubber exhibiting a sufficient improvement in low fuel consumption performance caused by main chain modification. The hydrogenation rate is more preferably 85% or more, still more preferably 90% or more, particularly preferably 92% or more. The maximum hydrogenation rate is 99% or less, preferably 98% or less, more preferably 97% or less, from the viewpoint of production efficiency. The hydrogenation rate is determined through $^1$H-NMR. The hydrogenation rate may be appropriately adjusted by modifying the amount of a hydrogenation catalyst, the hydrogen pressure during hydrogenation reaction, or the reaction time.

Conceivably, hydrogenation of the main-chain-modified conjugated diene-based polymer leads to an increase in the mobility of the main chain, resulting in increased interaction between the modified moiety of the main chain and silica.

The hydrogenated conjugated diene-based polymer is preferably produced by a method involving solution polymerization of monomers including the corresponding conjugated diene compound in the presence of an organic lithium catalyst, optional modification reaction of the resultant polymer solution, and then hydrogenation reaction of the polymer solution. Such a method is industrially useful. The hydrogenated conjugated diene-based polymer of the present disclosure is isolated from the above-prepared solution through removal of the solvent therefrom. The polymer can be isolated by, for example, a known solvent removal method (e.g., steam stripping) and a drying operation (e.g., thermal treatment).

The hydrogenated conjugated diene-based polymer of the present disclosure has, at a side chain moiety thereof, a functional group capable of interacting with silica. Preferably, the polymer further has, at a terminal thereof, one or more functional groups selected from the group consisting of amino groups (including a primary amino group, a secondary amino group, and a tertiary amino group), a group having a carbon-nitrogen double bond, a nitrogen-containing heterocyclic group, a phosphino group, a thiol group, and a hydrocarbyloxysilyl group. In the case of application of the polymer to, for example, tires, the presence of such a functional group can lead to an improvement in the dispersibility of a reinforcing filler (e.g., silica), resulting in improved low hysteresis loss property.

The group having a carbon-nitrogen double bond is, for example, "—N=CR$^{21}$R$^{22}$" (where R$^{21}$ represents a hydrogen atom or a hydrocarbyl group, and R$^{22}$ represents a hydrocarbyl group). The hydrocarbyl group represented by R$^{21}$ or R$^{22}$ may be the same as those represented by R$^1$ or R$^2$ in the aforementioned formula (1). The nitrogen-containing heterocyclic group corresponds to a group prepared through removal of one hydrogen atom from a nitrogen-containing heterocyclic ring. Examples of the nitrogen-containing heterocyclic group include a 1-imidazolyl group, a 4,5-dihydro-1-imidazolyl group, a 1-piperidino group, a 1-piperazinyl group, a pyridyl group, and a morpholino group.

The hydrogenated conjugated diene-based polymer of the present disclosure has, at a side chain moiety thereof, a functional group capable of interacting with silica in an amount of preferably 1 mol relative to 50 mol to 5,000 mol of the monomers. An excessively small amount of the functional group at the side chain moiety leads to a reduced effect of improving the dispersibility of silica, whereas an excessively large amount of the functional group at the side chain moiety may lead to a reduction in the elongation at break of the resultant crosslinked rubber. The amount of the functional group capable of interacting with silica is more preferably 1 mol relative to 100 mol to 3,000 mol of the monomers, still more preferably 1 mol relative to 200 mol to 1,000 mol of the monomers. The amount of the functional group capable of interacting with silica contained in the polymer can be calculated on the basis of, for example, the types and consumed amounts of the monomers and specific compounds used for the synthesis.

The hydrogenated conjugated diene-based polymer of the present disclosure, which is produced as described above, has, at a side chain moiety thereof, a functional group capable of interacting with silica and includes a butadiene-derived structural unit satisfying the following requirement P: (Requirement P) The following formula (A) is satisfied:

$$0.80 \leq (p+r)/(p+q+r+s) \leq 0.99 \quad \text{(A)}$$

where p represents the ratio of a structural unit represented by the following formula (2) in the polymer, q represents the ratio of a structural unit represented by the following formula (3) in the polymer, r represents the ratio of a structural unit represented by the following formula (4) in the polymer, and s represents the ratio of a structural unit represented by the following formula (5) in the polymer:

(2)

(3)

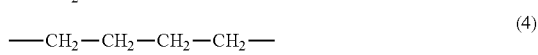
(4)

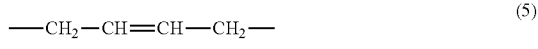
(5)

The aforementioned formula (A) corresponds to the following description "the hydrogenation rate of butadiene-derived structural units is 80 to 99%."

<Polymer Composition>

The polymer composition of the present disclosure contains the aforementioned hydrogenated conjugated diene-based polymer, silica, and a crosslinking agent. The amount of the hydrogenated conjugated diene-based polymer contained in the polymer composition is preferably 20 mass % or more, more preferably 30 mass % or more, still more preferably 40 mass % or more, relative to the total amount of the polymer composition.

Examples of the silica include wet silica (hydrated silica), dry silica (silicic anhydride), colloidal silica, precipitated silica, calcium silicate, and aluminum silicate. Of these, wet silica is particularly preferred from the viewpoints of an improvement in fracture resistance, and the compatibility between wet grip property and low rolling resistance. The use of high dispersible-type silica is preferred for achieving effective dispersion of the silica in the polymer composition and improvements in physical properties and processability. These silica materials may be used singly or in combination of two or more species.

The polymer composition may optionally include any reinforcing filler (e.g., carbon black, clay or calcium carbonate) in addition to the silica. Silica singly or a combination of carbon black and silica is preferably used as the filler. The total amount of silica and carbon black contained in the polymer composition is preferably 20 to 130 parts by mass, more preferably 25 to 110 parts by mass, relative to 100 parts by mass of the total amount of polymer components contained in the polymer composition.

Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of polymer components contained in the polymer composition.

The polymer composition of the present disclosure, which contains the hydrogenated conjugated diene-based polymer, may contain an additional rubber component. Examples of the type of the additional rubber component include, but are not particularly limited to, butadiene rubber (BR, such as high cis BR having a cis-1,4 bond content of 90% or more, or BR containing syndiotactic-1,2-polybutadiene (SPB)), styrene butadiene rubber (SBR), natural rubber (NR), isoprene rubber (IR), styrene-isoprene copolymer rubber, and butadiene-isoprene copolymer rubber. The additional rubber component is more preferably BR or SBR.

The polymer composition may contain, in addition to the aforementioned components, any additive that is commonly used in a rubber composition for tire. Examples of the additive include an antioxidant, zinc oxide, stearic acid, a softener, sulfur, a vulcanization accelerator, a silane coupling agent, a compatibilizer, a vulcanization aid, a processing aid, a process oil, and an anti-scorching agent. The amount of such additives incorporated into the polymer composition may be appropriately determined, so long as the advantageous effects of the present disclosure are not impaired.

The polymer composition of the present disclosure can be prepared through kneading of the polymer component, the crosslinking agent, and an optional component by means of, an open-type kneader (e.g., a roll) or a closed-type kneader (e.g., a Banbury mixer). The polymer composition is prepared into a crosslinked polymer through molding and subsequent crosslinking (vulcanization). The resultant crosslinked polymer can be applied to various rubber products. For example, the crosslinked polymer can be applied to tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines and facilities; hoses and hose covers, such as diaphragm, roll, radiator hose, and air hose; belts, such as belts for power transmission; linings; dust boots; materials for medical devices; fenders; insulating materials for electric wires; and other industrial products. In particular, the vulcanized rubber obtained by using the hydrogenated conjugated diene-based polymer of the present disclosure achieve excellent wet grip property, low hysteresis loss property, and abrasion resistance. Thus, the vulcanized rubber of the present disclosure is suitable for use as a material of a tire tread or sidewall.

The tire can be produced by a customary method. For example, the polymer composition is mixed by means of a kneader to form a sheet, and the sheet is disposed at a predetermined position and vulcanized by a customary method, to thereby form a tread rubber or a sidewall rubber. A pneumatic tire is thereby produced.

EXAMPLES

The present disclosure will next be described in detail by way of examples, which should not be construed as limiting the disclosure thereto. Unless otherwise specified, the units "part(s)" and "%" described in Examples and Comparative Examples refer to "part(s) by mass" and "mass %," respectively. Physical properties are determined as described below.

[Bonded styrene content (mass %)]: the content of styrene-derived or styrene derivative-derived structural units was determined by means of $^1$H-NMR (500 MHz).

[Vinyl bond content (mass %)]: the 1,2-vinyl bond content of a polymer was determined by means of $^1$H-NMR (500 MHz).

[Molecular weight before modification]: the molecular weight (in terms of polystyrene) was determined from the retention time corresponding to the vertex of the maximum peak of a gel permeation chromatography (GPC) curve obtained by means of GPC (HLC-8120GPC (trade name, manufactured by Tosoh Corporation)).

(GPC Conditions)
Column: trade name "GMHXL" (manufactured by Tosoh Corporation) (two columns)
Column temperature: 40° C.
Mobile phase: tetrahydrofuran
Flow rate: 1.0 mL/min
Sample concentration: 10 mg/20 mL

[Styrene long-chain ratio]: the styrene long-chain ratio θst (i.e., the ratio of a chain that is composed of eight or more consecutive structural units derived from styrene to the total structural units derived from styrene included in the polymer) was calculated as described below. The ratio of the integral value Σ(a) within the chemical shift range (a) to the sum Σ(a, b, c) of the integral values respectively within the chemical shift ranges (a) to (c) in the $^1$H-NMR spectrum (500 MHz) measured using deuterated chloroform as a solvent is calculated, multiplied by 2.5, and taken as the styrene long-chain ratio θst (see the following expression (1)).

(a) A chain of eight or more consecutive structural units derived from styrene: 6.00≤S<6.68
(b) A chain of 2 to 7 consecutive structural units derived from styrene: 6.68≤S<6.89
(c) A short chain derived from styrene: 6.89≤S<8.00

$$\theta st(\text{wt \%}) = (\Sigma(a)/\Sigma(a,b,c)) \times 2.5 \quad (1)$$

[Hydrogenation rate (%)]: the hydrogenation rate was determined by $^1$H-NMR (500 MHz).

[Mooney viscosity (ML1+4, 100° C.)]: the Mooney viscosity was measured in accordance with JIS K 6300-1:2013 using an L rotor (preheating time: 1 minute, rotor operation time: 4 minutes, temperature: 100° C.).

<Synthesis of (Hydrogenated) Conjugated Diene-Based Polymer>

Example 1-1

Cyclohexane (2,500 g), 2,2-di(2-tetrahydrofuryl)propane (2.45 mmol), styrene (125 g), and 1,3-butadiene (365 g) were added to an autoclave reactor (inner volume: 5 L) purged with nitrogen. The internal temperature of the reactor was adjusted to 10° C., and then n-butyllithium (5.20 mmol), serving as an initiator, was added to thereby initiate polymerization. The polymerization was performed under adiabatic conditions, and the maximum temperature reached 85° C. After the polymerization conversion had reached 99% (22 minutes after initiation of the polymerization), 1,3-butadiene (10 g) was added over two minutes for further polymerization for three minutes, and then isopropanol (5.20 mmol) was added to thereby terminate the reaction. Thereafter, pinacolborane (13.4 mmol) was added, and then reaction was allowed to proceed for 15 minutes.

Subsequently, N-[2-[3-(trimethoxysilyl)propylamino]ethyl]ethylenediamine (13.4 mmol) was added to the resultant polymer solution, and then reaction was allowed to proceed for 15 minutes.

Subsequently, the resultant reaction mixture was heated to 80° C. or higher, and hydrogen was introduced into the reaction system. Thereafter, [bis(η5-cyclopentadienyl)titanium(tetrahydrofurfuryloxy) chloride](which may be referred to as "[chlorobis(2,4-cyclopentadienyl)titanium(IV) tetrahydrofurfuryl alkoxide]") (0.36 g), diethylaluminum chloride (0.58 g), and n-butyllithium (0.14 g) were added, and then reaction was allowed to proceed so as to maintain a hydrogen pressure of 1.0 MPa. After the cumulative hydrogen amount had reached a predetermined level, the reaction mixture (i.e., polymer solution) was removed from the reactor at ambient temperature and ambient pressure.

Subsequently, 2,6-di-tert-butyl-p-cresol (4.4 g) was added to the polymer solution. An aqueous solution (temperature:

80° C.) having a pH (measured at 80° C. by the glass electrode method, the same shall apply hereinafter) of 8.5 (adjusted with ammonia) was added to a solvent removing vessel, and the polymer solution was added thereto so that the amount of the aqueous solution having a pH of 8.5 was 200 parts by mass relative to 100 parts by mass of the polymer solution. The solvent was removed through steam stripping (steam temperature: 190° C.) for two hours (temperature of the liquid phase of the solvent removing vessel: 95° C.), followed by drying by means of a heat roller at 110° C., to thereby produce a hydrogenated conjugated diene-based polymer A1.

Example 1-2

Polymerization was initiated in the same manner as Example 1-1 described above, except that styrene (100 g) and 4-methylstyrene (25 g) were added to an autoclave reactor in place of styrene (125 g) before initiation of polymerization. The polymerization was terminated through addition of isopropanol. Subsequently, n-butyllithium (13.4 mmol) and tetramethylethylenediamine (13.4 mmol) were added, and then reaction was allowed to proceed at 80° C. for 10 minutes. Thereafter, N,N-bis(trimethylsilyl)aminopropylmethyldiethoxysilane (13.4 mmol) was added, and then reaction was allowed to proceed for 15 minutes.

Subsequently, hydrogenation and solvent removal were performed in the same manner as Example 1-1 described above, followed by drying by means of a heat roller at 110° C., to thereby produce a hydrogenated conjugated diene-based polymer A2.

Example 1-3

Polymerization was initiated in the same manner as Example 1-1 described above, and the polymerization was terminated through addition of isopropanol. Subsequently, 3-mercaptopropane-1,2-diol (13.4 mmol) and a solution of azobisisobutyronitrile (AIBN) (1.0 mmol) in toluene were added, followed by reaction of the resultant mixture at 80° C. for seven hours.

Subsequently, hydrogenation and solvent removal were performed in the same manner as Example 1-1 described above, followed by drying by means of a heat roller at 110° C., to thereby produce a hydrogenated conjugated diene-based polymer A3.

Example 1-4

Polymerization was initiated in the same manner as Example 1-1 described above, except that styrene (122 g) and a mixture of 3-(1-pyrrolidinyl)ethylstyrene and 4-(1-pyrrolidinyl)ethylstyrene (3 g) were added to an autoclave reactor in place of styrene (125 g) before initiation of polymerization. The polymerization was terminated through addition of isopropanol. Thereafter, hydrogenation and solvent removal were performed in the same manner as Example 1-1 described above, followed by drying by means of a heat roller at 110° C., to thereby produce a hydrogenated conjugated diene-based polymer A4.

Example 1-5

The procedure of Example 1-1 was repeated, except that cyclohexane (2,500 g), 2,2-di(2-tetrahydrofuryl)propane (2.45 mmol), styrene (125 g), 1,3-butadiene (365 g), and piperidine (4.20 mmol) were added to an autoclave reactor before initiation of polymerization, and reaction was allowed to proceed for 15 minutes by addition of N,N-bis(trimethylsilyl)aminopropylmethyldiethoxysilane (4.46 mmol) in place of isopropanol, to thereby produce a hydrogenated conjugated diene-based polymer A5.

Example 1-6

The procedure of Example 1-5 was repeated, except that the amount of piperidine was changed to 3.00 mmol, the amount of n-butyllithium was changed to 3.70 mmol, and the amount of N,N-bis(trimethylsilyl)aminopropylmethyldiethoxysilane was changed to 3.17 mmol, to thereby produce a hydrogenated conjugated diene-based polymer A6.

Comparative Example 1-1

Synthesis was performed in the same manner as Example 1-1, except that the modification reaction by use of pinacolborane and N-[2-[3-(trimethoxysilyl)propylamino]ethyl]ethylenediamine was omitted, and the hydrogenation was omitted, to thereby produce a conjugated diene-based polymer B1.

Comparative Example 1-2

Synthesis was performed in the same manner as Example 1-1, except that the modification reaction by use of pinacolborane and N-[2-[3-(trimethoxysilyl)propylamino]ethyl]ethylenediamine was omitted, to thereby produce a hydrogenated conjugated diene-based polymer B2.

Comparative Example 1-3

Synthesis was performed in the same manner as Example 1-1, except that the hydrogenation was omitted, to thereby produce a conjugated diene-based polymer B3.

Comparative Example 1-4

Synthesis was performed in the same manner as Example 1-2, except that the hydrogenation was omitted, to thereby produce a conjugated diene-based polymer B4.

Comparative Example 1-5

Synthesis was performed in the same manner as Example 1-3, except that the hydrogenation was omitted, to thereby produce a conjugated diene-based polymer B5.

Comparative Example 1-6

Synthesis was performed in the same manner as Example 1-4, except that the hydrogenation was omitted, to thereby produce a conjugated diene-based polymer B6.

Comparative Example 1-7

Synthesis was performed in the same manner as Example 1-5, except that the modification reaction by use of pinacolborane and N-[2-[3-(trimethoxysilyl)propylamino]ethyl]ethylenediamine was omitted, to thereby produce a hydrogenated conjugated diene-based polymer B7.

Comparative Example 1-8

Synthesis was performed in the same manner as Example 1-1, except that the hydrogenation was omitted, and the amount of n-butyllithium added was changed to 3.70 mmol, to thereby produce a conjugated diene-based polymer B8.

Comparative Example 1-9

Synthesis was performed in the same manner as Example 1-6, except that the modification reaction by use of pinacolborane and N-[2-[3-(trimethoxysilyl)propylamino]ethyl] ethylenediamine was omitted, to thereby produce a conjugated diene-based polymer B9.

Table 1 shows the polymerization formulations of the Examples and Comparative Examples, and the results of determination of the properties of the polymers.

TABLE 1

|  |  | Example 1-1 | Example 1-2 | Example 1-3 | Example 1-4 | Example 1-5 | Example 1-6 | Comparative Example 1-1 | Comparative Example 1-2 | Comparative Example 1-3 | Comparative Example 1-4 |
|---|---|---|---|---|---|---|---|---|---|---|---|
| Type of (hydrogenated) conjugated diene-based polymer |  | A1 | A2 | A3 | A4 | A5 | A6 | B1 | B2 | B3 | B4 |
| Cyclohexane | (g) | 2500 | 2500 | 2500 | 2500 | 2500 | 2500 | 2500 | 2500 | 2500 | 2500 |
| Compound G | (mmol) | 2.45 | 2.45 | 2.45 | 2.45 | 2.45 | 2.45 | 2.45 | 2.45 | 2.45 | 2.45 |
| Styrene | (g) | 125 | 100 | 125 | 122 | 125 | 125 | 125 | 125 | 125 | 100 |
| 1,3-Butadiene | (g) | 365 | 365 | 365 | 340 | 365 | 365 | 365 | 365 | 365 | 365 |
| 4-methylstyrene | (g) | — | 25 | — | — | — | — | — | — | — | 25 |
| Compound H | (g) | — | — | — | 3 | — | — | — | — | — | — |
| Supplemental butadiene | (g) | 10 | 10 | 10 | 10 | 10 | 10 | 10 | 10 | 10 | 10 |
| n-Butyllithium | (mmol) | 5.2 | 5.2 | 5.2 | 5.2 | 5.2 | 3.7 | 5.2 | 5.2 | 5.2 | 5.2 |
| Piperidine | (mmol) | — | — | — | — | 4.2 | 3.0 | — | — | — | — |
| Terminal-modifying agent |  |  |  |  |  |  |  |  |  |  |  |
| Compound C | (mmol) | — | — | — | — | 4.46 | 3.17 | — | — | — | — |
| Main-chain-modifying agent |  |  |  |  |  |  |  |  |  |  |  |
| Compound D | (mmol) | 13.4 | — | — | — | 13.4 | 13.4 | — | — | 13.4 | — |
| n-Butyllithium | (mmol) | — | 13.4 | — | — | — | — | — | — | — | 13.4 |
| Compound E | (mmol) | — | — | 13.4 | — | — | — | — | — | — | — |
| AIBN | (mmol) | — | — | 1.0 | — | — | — | — | — | — | — |
| Compound C | (mmol) | — | 13.4 | — | — | — | — | — | — | — | 13.4 |
| Compound F | (mmol) | 13.4 | — | — | — | 13.4 | 13.4 | — | — | 13.4 | — |
| Bonded styrene content | (mass %) | 25 | 24 | 25 | 25 | 24 | 25 | 24 | 25 | 24 | 24 |
| Styrene long-chain ratio | (mass %) | 2.9 | 3.7 | 3.1 | 2.7 | 3.4 | 2.9 | 2.8 | 2.9 | 3.4 | 3.5 |
| Vinyl bond content | (mass %) | 55 | 54 | 55 | 54 | 55 | 55 | 55 | 55 | 55 | 56 |
| Weight average molecular weight | (×10$^4$) | 20 | 19 | 20 | 19 | 19 | 29 | 20 | 20 | 19 | 20 |
| Hydrogenation rate | (%) | 95 | 96 | 95 | 95 | 94 | 94 | 0 | 94 | 0 | 0 |
| Mooney viscosity (ML1 + 4, 100° C.) |  | 54 | 58 | 65 | 51 | 56 | 72 | 5 | 53 | 11 | 16 |

|  |  | Comparative Example 1-5 | Comparative Example 1-6 | Comparative Example 1-7 | Comparative Example 1-8 | Comparative Example 1-9 |
|---|---|---|---|---|---|---|
| Type of (hydrogenated) conjugated diene-based polymer |  | B5 | B6 | B7 | B8 | B9 |
| Cyclohexane | (g) | 2500 | 2500 | 2500 | 2500 | 2500 |
| Compound G | (mmol) | 2.45 | 2.45 | 2.45 | 2.45 | 2.45 |
| Styrene | (g) | 125 | 122 | 125 | 125 | 125 |
| 1,3-Butadiene | (g) | 365 | 340 | 365 | 365 | 365 |
| 4-methylstyrene | (g) | — | — | — | — | — |
| Compound H | (g) | — | 3 | — | — | — |
| Supplemental butadiene | (g) | 10 | 10 | 10 | 10 | 10 |
| n-Butyllithium | (mmol) | 5.2 | 5.2 | 5.2 | 3.7 | 3.7 |
| Piperidine | (mmol) | — | — | 4.2 | — | 3.0 |
| Terminal-modifying agent |  |  |  |  |  |  |
| Compound C | (mmol) | — | — | 4.46 | — | 3.17 |
| Main-chain-modifying agent |  |  |  |  |  |  |
| Compound D | (mmol) | — | — | — | 13.4 | — |
| n-Butyllithium | (mmol) | — | — | — | — | — |
| Compound E | (mmol) | 13.4 | — | — | — | — |
| AIBN | (mmol) | 1.0 | — | — | — | — |
| Compound C | (mmol) | — | — | — | — | — |
| Compound F | (mmol) | — | — | — | 13.4 | — |
| Bonded styrene content | (mass %) | 25 | 25 | 24 | 25 | 25 |
| Styrene long-chain ratio | (mass %) | 2.8 | 3.1 | 2.6 | 3.1 | 2.9 |
| Vinyl bond content | (mass %) | 54 | 55 | 55 | 55 | 55 |
| Weight average molecular weight | (×10$^4$) | 19 | 20 | 19 | 29 | 28 |
| Hydrogenation rate | (%) | 0 | 0 | 96 | 0 | 94 |
| Mooney viscosity (ML1 + 4, 100° C.) |  | 22 | 9 | 51 | 21 | 69 |

The abbreviations of compounds shown in Table 1 are as follows.
- Compound G: 2,2-di(2-tetrahydrofuryl)propane
- Compound H: mixture of 3-(1-pyrrolidinyl)ethylstyrene and 4-(1-pyrrolidinyl)ethylstyrene
- Compound C: N,N-bis(trimethylsilyl)aminopropylmethyldiethoxysilane
- Compound D: pinacolborane
- Compound E: 3-mercaptopropane-1,2-diol
- Compound F: N-[2-[3-(trimethoxysilyl)propylamino]ethyl]ethylenediamine <Production of Rubber Composition and Vulcanized Rubber, and Evaluation Therefor>

Example 2-1

(1) Production of Rubber Composition and Vulcanized Rubber

The hydrogenated conjugated diene-based polymer A1 was mixed with other components according to the formulation shown below in Table 2, and the mixture was kneaded to produce a rubber composition. The kneading was performed as follows. In a first kneading step, the hydrogenated conjugated diene-based polymer A1, an extender oil, silica, carbon black, a silane coupling agent, stearic acid, an antioxidant, and zinc oxide were mixed and kneaded by means of a plastomill (inner volume: 250 mL) equipped with a temperature controller (charging rate: 72%, rotation speed: 60 rpm). In a second kneading step, the above-kneaded product was cooled to room temperature, and then mixed with sulfur and a vulcanization accelerator, followed by kneading. The resultant product was molded and vulcanized by means of a vulcanizing press at 160° C. for a specific period of time, to thereby produce a vulcanized rubber.

TABLE 2

| Compounding formulation | | Parts by mass |
|---|---|---|
| (Hydrogenated) conjugated diene-based polymer | | 100 |
| Extender oil | *1 | 37.5 |
| Silica | *2 | 70 |
| Carbon black | *3 | 5.6 |
| Silane coupling agent | *4 | 5.6 |
| Stearic acid | | 2 |
| Antioxidant | *5 | 1 |
| Zinc oxide | | 3 |
| Vulcanization accelerator D | *6 | 1.5 |
| Vulcanization accelerator CZ | *7 | 1.8 |
| Sulfur | | 1.5 |

The details of each component in Table 2 are shown below.
*1: JOMO Process NC-140 manufactured by Japan Energy Corporation, *2: ZEOSIL 1165MP manufactured by Rhodia, *3: DIABLACK N339 manufactured by Mitsubishi Chemical Corporation, *4: Si75 manufactured by Evonik, *5: OZONONE 6C manufactured by Seiko Chemical Co., Ltd., *6: NOCCELER D manufactured by Ouchi Shinko Chemical Industrial Co., Ltd., *7: NOCCELER CZ manufactured by Ouchi Shinko Chemical Industrial Co., Ltd.

(2) Evaluation of Properties

The vulcanized rubber prepared in (1) above was evaluated for the following properties regarding tire performance.

(i) Tensile strength: 300% modulus was determined according to JIS K6251:2010. 300% modulus was indicated by an index. A higher index indicates high (superior) tensile strength.

(ii) 0° C. tan δ: determined by means of a dynamic spectrometer (manufactured by Rheometrics, USA) at a tensile dynamic strain of 0.14%, an angular velocity of 100 radians/sec, and 0° C. 0° C. tan δ was indicated by an index. A higher index indicates superior wet grip property.

(iii) 70° C. tan δ: determined by means of a dynamic spectrometer (manufactured by Rheometrics, USA) at a tensile dynamic strain of 0.7%, an angular velocity of 100 radians/sec, and 70° C. 70° C. tan δ was indicated by an index. A higher index indicates low (superior) hysteresis loss property.

(iv) Abrasion resistance: determined by means of a DIN wear tester (manufactured by Toyo Seiki) according to JIS K6264-2:2005 at a load of 10 N and 25° C. Abrasion resistance was indicated by an index. A higher index indicates superior abrasion resistance.

Examples 2-2 to 2-6 and Comparative Examples 2-1 to 2-9

The procedure of Example 2-1 was repeated, except that the hydrogenated conjugated diene-based polymer A1 was replaced with a (hydrogenated) conjugated diene-based polymer as shown in Table 3, to thereby produce a rubber composition and a vulcanized rubber. The rubber composition and the vulcanized rubber were evaluated for the aforementioned properties in the same manner as Example 2-1. Table 3 shows the results of evaluation in the Examples and Comparative Examples. Each of the properties shown in Table 3 was indicated by an index relative to that (taken as 100) of Comparative Example 2-1.

TABLE 3

| | Example 2-1 | Example 2-2 | Example 2-3 | Example 2-4 | Example 2-5 | Example 2-6 | Comparative Example 2-1 | Comparative Example 2-2 | Comparative Example 2-3 |
|---|---|---|---|---|---|---|---|---|---|
| Type of (hydrogenated) conjugated diene-based polymer | A1 | A2 | A3 | A4 | A5 | A6 | B1 | B2 | B3 |
| Tensile strength (INDEX) | 184 | 191 | 203 | 178 | 196 | 212 | 100 | 168 | 108 |
| 0° C. tan δ (INDEX) | 129 | 128 | 138 | 114 | 128 | 131 | 100 | 93 | 122 |
| 70° C. tan δ (INDEX) | 143 | 147 | 132 | 124 | 176 | 172 | 100 | 84 | 125 |
| Abrasion resistance (INDEX) | 128 | 133 | 143 | 142 | 137 | 152 | 100 | 131 | 112 |

| | Comparative Example 2-4 | Comparative Example 2-5 | Comparative Example 2-6 | Comparative Example 2-7 | Comparative Example 2-8 | Comparative Example 2-9 |
|---|---|---|---|---|---|---|
| Type of (hydrogenated) conjugated diene-based polymer | B4 | B5 | B6 | B7 | B8 | B9 |
| Tensile strength (INDEX) | 111 | 106 | 109 | 176 | 121 | 128 |

TABLE 3-continued

| | | | | | | |
|---|---|---|---|---|---|---|
| 0° C. tanδ (INDEX) | 124 | 132 | 111 | 103 | 122 | 102 |
| 70° C. tanδ (INDEX) | 128 | 108 | 105 | 134 | 125 | 121 |
| Abrasion resistance (INDEX) | 108 | 113 | 104 | 134 | 121 | 146 |

As shown in Table 3, vulcanized rubbers prepared from the hydrogenated conjugated diene-based polymers A1 to A6, each having, at a side chain moiety thereof, a functional group capable of interacting with silica, exhibited well-balanced improvements in tensile strength, wet grip property, low hysteresis loss property, and abrasion resistance; i.e., excellent rubber properties.

The invention claimed is:

1. A method for producing a hydrogenated conjugated diene-based polymer which is a hydrogenation product of a conjugated diene-based polymer comprising butadiene-derived structural units, the method comprising:
   preparing a conjugated diene-based polymer having, at a side chain moiety thereof, a functional group capable of interacting with silica by reacting a specific compound having the functional group capable of interacting with silica and at least one selected from the group consisting of an unsaturated bond moiety and a functional group moiety of the conjugated diene-based polymer, the moieties differing from the terminals of the polymer, to introduce the functional group capable of interacting with silica in the side chain moiety thereof; and
   hydrogenating the conjugated diene-based polymer so as to achieve a hydrogenation rate of 80 to 99% of butadiene-derived structural units comprised in the conjugated diene-based polymer.

2. The method for producing a hydrogenated conjugated diene-based polymer according to claim 1, wherein the specific compound comprises a compound [A] comprising a Group 4 or 13 element of the periodic table; and
   the conjugated diene-based polymer having, at a side chain moiety thereof, the functional group capable of interacting with silica is prepared through reaction between the compound [A] and an unsaturated bond moiety of the conjugated diene-based polymer, the moiety differing from the terminals of the polymer.

3. The method for producing a hydrogenated conjugated diene-based polymer according to claim 2, wherein the specific compound further comprises a compound [B] which has the functional group capable of interacting with silica and can react with a reactive moiety of a polymer prepared through reaction with the compound [A]; and
   the conjugated diene-based polymer having, at a side chain moiety thereof, the functional group capable of interacting with silica is prepared through reaction between the compound [A] and an unsaturated bond moiety of the conjugated diene-based polymer, the moiety differing from the terminals of the polymer, and reaction between the compound [B] and a polymer prepared through the reaction between the compound [A] and the unsaturated bond moiety.

4. The method for producing a hydrogenated conjugated diene-based polymer according to claim 1, wherein the conjugated diene-based polymer having, at a side chain moiety thereof, the functional group capable of interacting with silica is prepared through lithiation of at least one selected from the group consisting of an unsaturated bond moiety and a functional group moiety of the conjugated diene-based polymer, the moieties differing from the terminals of the polymer, and reaction between the lithiated polymer and the specific compound.

5. The method for producing a hydrogenated conjugated diene-based polymer according to claim 1, wherein the conjugated diene-based polymer having, at a side chain moiety thereof, the functional group capable of interacting with silica is prepared through reaction in the presence of a radical generator between the specific compound and an unsaturated bond moiety of the conjugated diene-based polymer, the moiety differing from the terminals of the polymer.

6. The method for producing a hydrogenated conjugated diene-based polymer according to claim 1, wherein the conjugated diene-based polymer having, at a side chain moiety thereof, the functional group capable of interacting with silica is prepared through polymerization of a monomer having the functional group capable of interacting with silica.

7. The method for producing a hydrogenated conjugated diene-based polymer according to claim 1, the method further comprising reacting the conjugated diene-based polymer having an active terminal prepared through polymerization in the presence of at least one selected from the group consisting of an alkali metal compound and an alkaline earth metal compound with a compound which comprises at least one atom selected from the group consisting of a nitrogen atom, a sulfur atom, a phosphorus atom, an oxygen atom, and a silicon atom and which can react with the active terminal.

8. The method for producing a hydrogenated conjugated diene-based polymer according to claim 1, wherein the conjugated diene-based polymer is prepared through polymerization in the presence of a compound prepared by mixing of at least one selected from the group consisting of an alkali metal compound and an alkaline earth metal compound with a nitrogen-containing compound.

* * * * *